UNITED STATES PATENT OFFICE.

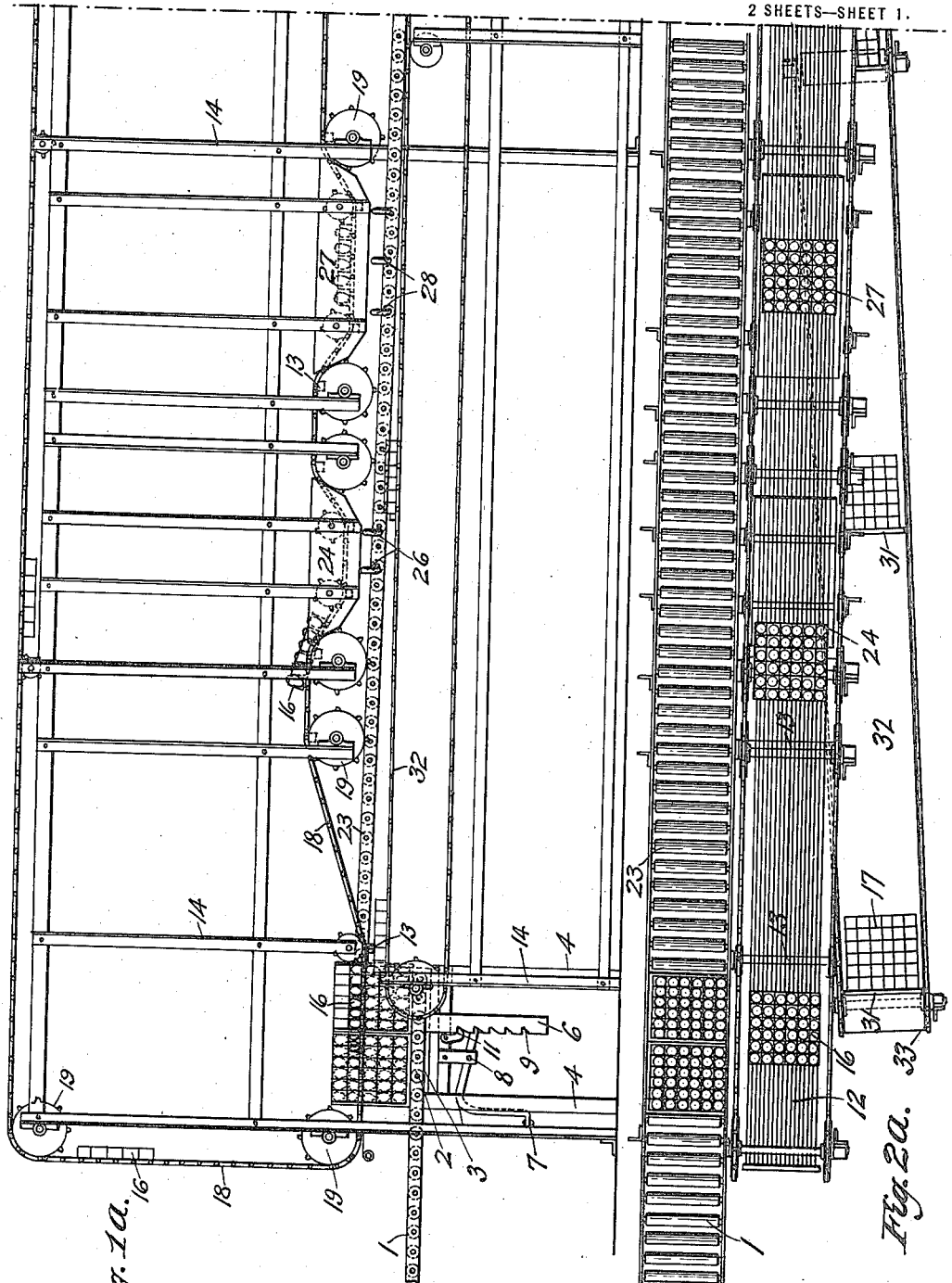

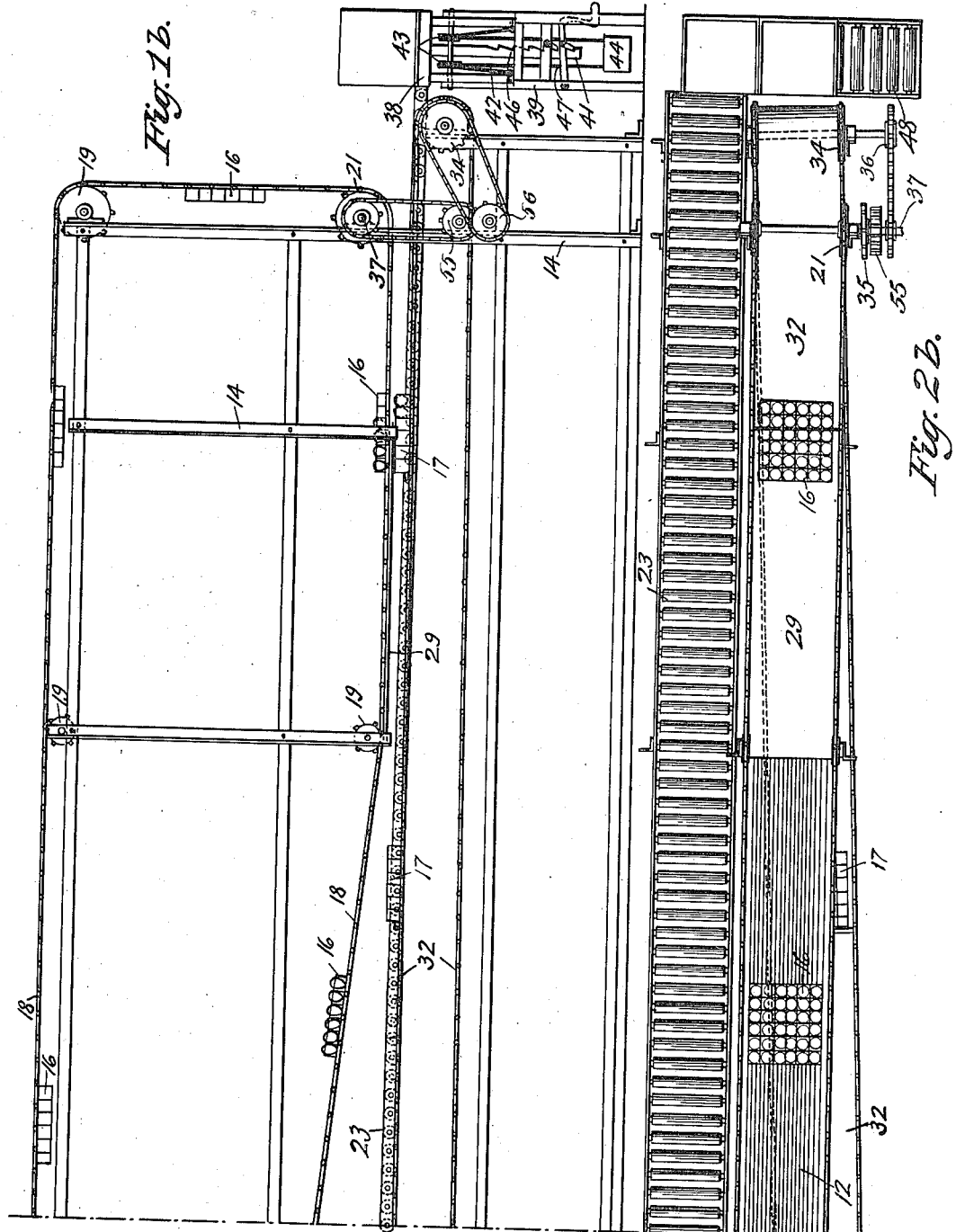

VICTOR CLAIREMONT, OF PETALUMA, CALIFORNIA.

APPARATUS FOR TREATING EGGS.

1,224,710. Specification of Letters Patent. Patented May 1, 1917.

Application filed April 10, 1915. Serial No. 20,482.

*To all whom it may concern:*

Be it known that I, VICTOR CLAIREMONT, a citizen of the United States, residing at Petaluma, in the county of Sonoma and State of California, have invented new and useful Improvements in Apparatus for Treating Eggs, of which the following is a specification.

The object of the present invention is to provide an improved apparatus by means of which eggs can be rapidly, conveniently and economically treated in any desired manner, as for instance, covered with a preservative solution.

In the accompanying drawing, Figure 1ª is a side elevation of one portion of the apparatus; Fig. 1ᵇ is a side elevation of the other portion thereof; Fig. 2ª is a plan view of the first portion; Fig. 2ᵇ is a plan view of the second portion.

Referring to the drawing, 1 indicates a runway for full egg cases, from which runway an egg case with its top and one side removed can be run on to the rollers 2, carried by a table 3 guided in a vertical guide frame 4, and attached to a lifter rod 6, which can be raised intermittently by means of a lever 7 pivoted at 8 upon the frame 4, and adapted to be operated by the foot of an attendant, which lever can engage in turn each of a series of notches 9 in the side of said rod, said rod being upheld in successively higher positions by a dog 11 engaging the notch above that engaged by the lever.

In proximity to said table 3 a series of wires 12 extend parallel with each other and sufficiently tight and close together to prevent eggs dropping therethrough, said wires being guided over transverse guides 13, supported by a frame 14, and traveling over said wires are square wire baskets 16, each having thirty-six compartments, the same in number as in each filler 17 in the egg case, each egg case containing ten fillers, in two vertical series of five each. The baskets 16 are attached to a pair of endless chains 18, which travel over idle pulleys 19 and a working pulley 21 supported by the frame 14.

After the full egg case has been moved into position on the frame, the attendant waits until an empty basket arrives at the proper position, almost exactly opposite to the foremost series of fillers, in which position its top is slightly below the bottom of, the uppermost filler of said series, and then rapidly moves the filler out of the egg case and over the basket, whereupon the eggs drop through the compartments of the filler into the corresponding compartments of the basket. This is done while the basket is drawn forward slowly by means of the endless chains. He then waits until the next basket arrives in the same position relative to the uppermost filler of the rear series and transfers the eggs of said filler in the same way to said basket. He then raises the egg case through the height of a filler, the notches being spaced from one another said height, and performs said operations with the next fillers of the egg case, transferring the eggs therefrom to succeeding baskets, and so on until all the eggs have been removed from the filler. He then pushes the empty egg case on to a runway 23, which leads to the forward end of the apparatus, down which runway said empty egg case runs to said other end to be used as will hereinafter appear. The endless chains draw the baskets on the wires first into and out of a tank 24 of preservative solution maintained warm by a gas burner 26, and then into and out of a tank 27 of preservative solution maintained hot by gas burners 28. The wires then slope downwardly and terminate at one end of a plate 29, preferably of wood, over which the endless chains draw the baskets.

Each filler, from which the eggs were emptied by the above operation, is placed by the attendant with its rear edge abutting against a cross strip or cleat 31 on an endless belt or conveyer 32 of canvas or the like below and slightly to one side of the wires 12, said conveyer traveling around an idle pulley 33 and a working pulley 34 mounted on the frame 14, said working pulley 21 being mounted on a shaft 37 and said pulley 34 being driven from said shaft 37 by means of sprocket wheels 35 and 36 thereon operatively connected respectively to gear wheels 55 and 56, so that the conveyer travels slightly slower than the endless chains and in a path at a slight angle therewith and being exactly under the same at the forward end of the plate 29, so that as each basket in turn passes over said forward end of the plate, the eggs drop from the compartments thereof into the corresponding compartment of the filler on the canvas conveyer. The baskets, having now discharged their office, are reconducted by the endless chains back for a further operation, but the fillers now filled with eggs, are brought by the canvas conveyer into close proximity with the open side of an empty egg case, which has traveled on the runway 23, and has been transferred by an attendant from said runway to the top of a table 38 vertically guided by guides 39 and having a lifter rod 41 having attached thereto a rope 42 around pulleys 43 and carrying a weight 44 heavier than the table and a case filled with eggs, said rod having therein notches 46 by which the table can, by means of a lever 47, be lowered intermittently the depth of a filler. As the egg case is lowered succeeding fillers can be placed one above the other therein. When the case has been filled with fillers containing eggs, it is transferred to a transverse runway 48.

It will be seen from the above construction that it only requires two attendants to fill the machine, which has a proved capacity of 105,000 eggs in a day of ten hours.

I claim:—

1. In combination, means for supporting eggs moving thereon, endless chains traveling adjacent to said means, open-bottomed wire baskets above said means and secured to said endless chains, means for treating eggs in said baskets while moving on said supporting means, and a traveling conveyer below said supporting means and having means for positioning fillers at intervals thereon, the path of said conveyer being such that a filler thereon will pass directly beneath the forward end of said supporting means.

2. In combination, means for supporting eggs moving thereon, endless chains traveling adjacent to said means, open-bottomed wire baskets above said means and secured to said endless chains, means for treating eggs in said baskets while moving on said supporting means, and a traveling conveyer below said supporting means and having means for positioning fillers at intervals thereon, the path of said conveyer being such that a filler thereon will pass directly beneath the forward end of said supporting means, one end of the conveyer being to one side of the rear end of said supporting means.

3. In combination, means for supporting eggs moving thereon, endless chains traveling adjacent to said means, open-bottomed wire baskets above said means and secured to said endless chains, means for treating eggs in said baskets while moving on said supporting means, a traveling conveyer below said supporting means and having means for positioning fillers at intervals thereon, the path of said conveyer being such that a filler thereon will pass directly beneath the forward end of said supporting means, and means for causing said endless chains and conveyer to travel at the same speed.

4. In combination, a series of parallel tight wires, endless chains traveling adjacent to the outermost wires of the series, open-bottomed wire baskets above said wires and secured to said endless chains, means for treating eggs in said baskets while moving on said wires, and a traveling conveyer beneath said wires and extending beyond them, and having means for positioning fillers at intervals thereon.

5. In combination, a series of parallel tight wires, endless chains traveling adjacent to the outermost wires of the series, open-bottomed wire baskets above said wires and secured to said endless chains, means for treating eggs in said baskets while moving on said wires, a traveling conveyer beneath said wires and extending beyond them, and having means for positioning fillers at intervals thereon, and means for causing the chains and conveyer to travel at the same speed.

6. In combination, a series of parallel tight wires, endless chains traveling adjacent to the outermost wires of the series, open-bottomed wire baskets above said wires and secured to said endless chains, means for treating eggs in said baskets while moving on said wires, a plate to which one end of each wire is secured and arranged so that the baskets travel thereover, a traveling conveyer beneath said plate and having means for positioning fillers at intervals thereon, the path of said conveyer being such that a filler thereon will pass directly beneath the other end of said plate, one end of the conveyer being below and to one side of the other ends of the wires.

7. In combination, a vertically movable table adapted to support an egg case, means for raising said table through a short distance at a time, a series of parallel tight wires extending near to said table, endless chains traveling adjacent to the outermost wires of the series, open-bottomed wire baskets above said wires and secured to said endless chains, means for treating eggs in said baskets while moving on said wires, a traveling conveyer beneath said wires and extending beyond them, and having means for positioning fillers at intervals thereon, one end of the conveyer being on the other side of the wires from the table and adjacent thereto, a vertically movable table close to the other end of said conveyer, and means for lowering said table through the height of a filler.

8. In combination, a vertically movable table adapted to support an egg case, means for raising said table through a short distance at a time, a series of parallel tight wires extending near to said table, endless chains traveling adjacent to the outermost wires of the series, open-bottomed wire baskets above said wires and secured to said endless chains, means for treating eggs in said baskets while moving on said wires, a traveling conveyer beneath said wires and extending beyond them and having means for positioning fillers at intervals thereon, one end of the conveyer being on the other side of the wires from the table and adjacent thereto, a vertically movable table close to the other end of said conveyer, means for lowering said table through the height of a filler, and means for causing the chains and conveyer to travel at the same speed.

9. In combination, a vertically movable table adapted to support an egg case, means for raising said table through a short distance at a time, a series of parallel tight wires extending near to said table, endless chains traveling adjacent to the outermost wires of the series, open-bottomed wire baskets above said wires and secured to said endless chains, means for treating eggs in said baskets while moving on said wires, a plate to which one end of each wire is secured, the baskets being arranged to travel over said plate, a traveling conveyer beneath said plate and having means for positioning fillers at intervals thereon, the path of said conveyer being such that a filler thereon will pass directly beneath the other end of said plate, one end of the conveyer being on the other side of the wires from the table and adjacent thereto, a vertically movable table close to the other end of said conveyer, and means for lowering said table through the height of a filler.

10. In combination, a runway for full egg cases, a vertically movable table adjacent to which said runway extends and adapted to support an egg case, a lifter rod secured to, and below, said table, means for vertically guiding the table, means for raising said lifter rod through a short distance at a time, means for supporting said table when not moving vertically, a series of parallel tight wires extending near to said table, endless chains traveling adjacent to the outermost wires of the series, open-bottomed wire baskets above said wires and secured to said endless chains, means for treating eggs in said baskets while moving on said wires, a plate to which one end of each wire is secured, the baskets being arranged to travel over said plate, a traveling conveyer beneath said plate and having means for positioning fillers at intervals thereon, the path of said conveyer being such that a filler thereon will pass directly beneath the other end of said plate, one end of the conveyer being on the other side of the wires from the table and adjacent thereto, a vertically movable table close to the other end of said conveyer, means for vertically guiding said table, means for lowering said table through the height of a filler, means for automatically supporting it when so lowered, and a runway leading from said table.

In testimony whereof I have hereunto set my hand in the presence of two subscribing witnesses.

VICTOR CLAIREMONT.

Witnesses:
F. M. WRIGHT,
D. B. RICHARDS.